United States Patent [19]
Cooke et al.

[11] Patent Number: 5,169,332
[45] Date of Patent: Dec. 8, 1992

[54] MEANS FOR LOCKING CABLES AND CONNECTOR PORTS

[75] Inventors: Kevin K. Cooke, Princeton, N.J.; Ronald V. Davidge, Coral Springs, Fla.; John R. DeWitt, Boca Raton, Fla.; Paul J. Galinis, Boynton Beach, Fla.; Jay H. Neer; Thomas H. Newsom, both of Boca Raton, Fla.

[73] Assignee: International Business Machines Corp., Armonk, N.Y.

[21] Appl. No.: 762,142

[22] Filed: Sep. 19, 1991

[51] Int. Cl.[5] .................. H01R 13/62; H01R 13/639
[52] U.S. Cl. .................................. 439/304; 439/347; 439/362; 439/372; 439/911
[58] Field of Search .............. 439/133, 144, 304, 362, 439/364, 347, 357, 358, 911, 350, 372

[56] References Cited

U.S. PATENT DOCUMENTS

| | | | |
|---|---|---|---|
| 3,027,535 | 3/1962 | Persson | 439/362 |
| 3,161,450 | 12/1964 | Goodenough | 439/304 |
| 3,500,130 | 10/1970 | Aument | 439/345 |
| 4,527,405 | 6/1985 | Renick et al. | 70/14 |
| 4,655,057 | 4/1987 | Derman | 70/14 |
| 4,669,281 | 6/1987 | Young | 70/57 |
| 4,685,312 | 8/1987 | Lakoski et al. | 70/14 |
| 4,741,185 | 5/1988 | Weinert et al. | 70/14 |
| 4,794,587 | 12/1988 | Cordiano | 369/292 |
| 4,898,009 | 3/1989 | Lakoski et al. | 70/58 |
| 4,907,111 | 3/1990 | Derman | 70/14 |
| 4,911,646 | 3/1990 | Marson et al. | 439/133 |
| 4,918,952 | 4/1990 | Lakoski et al. | 70/57 |
| 4,922,734 | 5/1990 | Iannucci | 70/58 |
| 4,924,683 | 5/1990 | Derman | 70/14 |
| 4,932,874 | 5/1990 | Hollopeter et al. | 439/133 |
| 4,964,286 | 10/1990 | Poyer | 70/58 |

Primary Examiner—Neil Abrams
Attorney, Agent, or Firm—Ronald V. Davidge

[57] ABSTRACT

A cable connector, terminator, or shield is fastened in place over a port connector in a unit having a lockable cover, by fastening means which can only be accessed when the cover is unlocked and opened or removed. In a first version, the cable connector, terminator, or shield includes a pair of tabs extending into the unit through a slot at each end of the port connector, with each tab having a notch which forms a latching surface. A rotatable bracket, engaging these latching surfaces, prevents the removal of the connector, terminator, or shield. With the cover opened or removed, this bracket can be rotated into a position in which the latching surfaces are released. In a second version, a locking bracket is provided to extend around an outer portion of the cable connector, terminator, or shield. This locking bracket includes a shaft extending through a hole into the unit, to be fastened in place by a nut engaging a threaded portion of the shaft. The nut can be accessed to release the shaft from within the unit only when the lockable cover is opened or removed. In a third version, the connector, terminator, or shield includes a pair of slidably mounted shafts, which extend through holes at each end of the port connector to engage holes within a latching bar. When the lockable cover is opened or removed, the latching bar can be manually slid from a locked position in which these shafts are held in place, to an unlocked position, in which they are released. Thus, in all versions, physical access to electronic circuits within the port connector is prevented as long as a cable connector, terminator, or shield is held in place with the lockable cover locked in its closed position.

14 Claims, 5 Drawing Sheets

MEANS FOR LOCKING CABLES AND CONNECTOR PORTS

BACKGROUND OF THE INVENTION

This invention relates to providing data security by preventing access to circuits extending from a unit such as a personal computer.

U.S. Pat. No. 4,669,281 (Young) shows a system in which data security is achieved by locking a structure in place over a connector, using a separate lock. The invention described herein has the advantage of not requiring a separate lock; the locks used to hold the covers of system and peripheral units in place are being used to hold the cables or connector locking devices in place as well. Also, while the Young reference discloses the use of a locked cover to prevent access to the means used ordinarily to hold the connector in place (screws in the example shown), the invention described herein uses separate, locked means to prevent removal of the connector regardless of the ordinary clamping means. The Young reference teaches the use of a cable, having, at least on one end, a connector with a pair of interfaces wired together, and a wire bundle extending from between these interfaces. The present invention is adapted to be used with more standard types of cables, having a wire bundle extending from a single interface.

A number of system units, such as, for example, personal computers and peripheral products use the interface Small Computer System Interface (SCSI). This interface allows the remote operation of storage devices, such as hard disk memories. These disk drives are powered by the personal computer. Such devices can be operated, using an external unit attached to SCSI interface circuits, to extract data from the e.g., computer or peripheral disk drive devices without the knowledge or consent of the owner of the device.

An Application, Ser. No. 762,141, filed concurrently herewith and assigned to the same assignee and entitled, "Cable Locking Covers" describes the use of individually locked covers to hold cables and terminators in place. In the apparatus described in that application, a terminator can be replaced by a shield block. The locking covers described in that disclosure are built primarily for use in locking external cables in place; they therefore have holes through which cable wires may pass, which must be plugged during other applications. The concept described therein when used on an external device port not requiring either a cable or a terminator requires the use of both a shield block and a bracket within the locking cover.

Our application, Ser. No. 762,138, entitled "Device-Port Locking Covers" filed concurrently herewith and assigned to the same assignee describes locking covers configured to be used on unused external device ports where a terminator (a connector wherein certain contacts are interconnected contacts) is not required. The invention described herein is configured to be used where an external cable or a terminator is connected to a port. The specific internal circuitry connected to such a port determines whether a terminator is required at an unused external port.

SUMMARY OF THE INVENTION

In a unit having a lockable cover, a cable or connector locking device, accessible only with the lockable cover removed, is used to prevent access to the circuits in a cable or connector port extending from the unit. The design prevents access to circuits within a cable or connector, where such circuits are ported from a unit with a lockable cover, without the removal of the lockable cover.

The design also allows for the use of peripherals made by a number of different manufacturers. Further, this invention provides a security function which is compatible with the use of cables and connectors of types presently in use, and facilitates the use of cables operating with the security features on units of types presently in use.

The design also controls emissions of electromagnetic energy which could interfere with communications signals. The design also provides a relatively strong, stiff mechanical connection between a cable or connector and the unit to which it is attached.

DESCRIPTION OF THE PREFERRED EMBODIMENTS

Figures 1, 2:
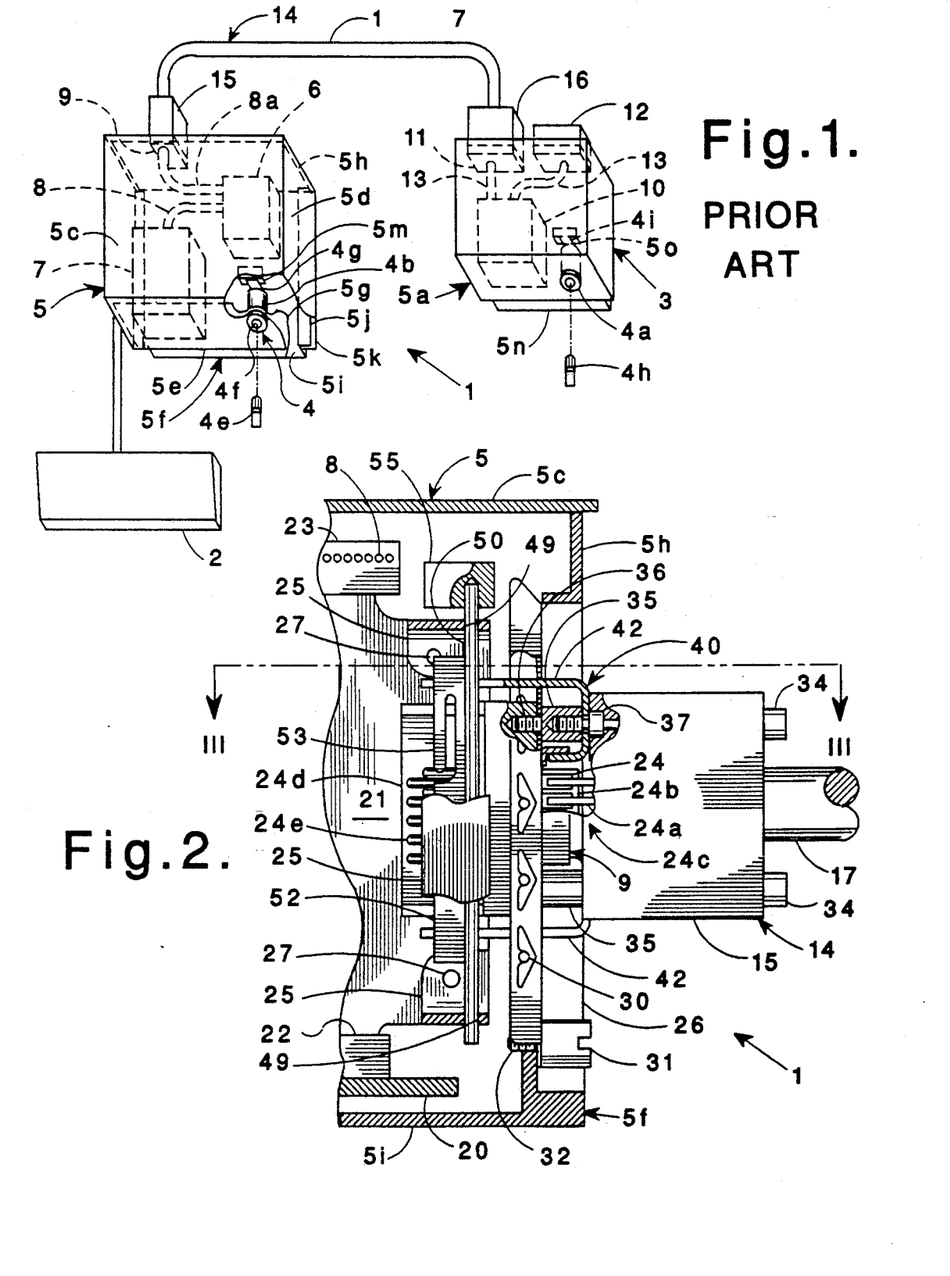
FIG. 1 is an overall perspective schematic drawing showing a typical system with which the present security system may be used.
FIG. 2 is an enlarged partial sectional view in a system unit showing an external cable attached, as viewed from the right (as seen in FIG. 1).

Referring to FIG. 1, a typical system using the SCSI interface includes a system unit 1, which may be, for example, a personal computer with an associated keyboard 2, and a peripheral unit 3 which may be, for example, a disk drive unit or other input-output device. Both system unit 1 and peripheral unit 3 include conventional mechanical locks 4 and 4a, which lock associated top covers 5 and 5a in place so that they cannot be removed without using a key. Top cover 5 of system unit 1 is of a conventional type, including a top surface 5c, end surfaces 5d, and a front surface 5e, being open to the rear. A machine frame 5f is also of a conventional type including a front surface 5g, a rear surface 5h, a lower surface 5i, and a pair of outward extending rail surfaces 5j, which lie above inward extending rail surfaces 5k of cover 5, preventing upward motion of cover 5 relative to machine frame 5f. Downward motion of cover 5 relative to frame 5f is prevented by front frame surface 5g and rear frame surface 5h extending upward within cover 5. Thus, cover 5 is constrained to be removed by sliding toward the front. Lock 4 is of a conventional type, having an external stator 4b, mounted firmly to a front frame surface 5g, extending through a hole in cover front surface 5e. When a properly encoded cylindrical key 4e is inserted into an annular slot between external rotor stator 4b and an internal rotor 4f, this rotor 4f can be freely turned through an angle sufficient to move interposing tab 4g, which is attached to turn with rotor 4f, away from a stop bracket 5m extending downward from cover top surface 5c, allowing forward motion of cover 5 relative to machine frame 5f. When a properly encoded cylindrical key 4e is not inserted in this manner, a conventional tumbler mechanism within lock 4 prevents the rotation of rotor 4f. Top cover 5a of peripheral unit 3 is of a type similar to system unit cover 5, except for variations in the size and shape as required to fit in place on the smaller peripheral unit 3. Thus, top cover 5a is constrained to be removed by sliding forward on a frame 5n, and is held in place by a lock 4a mounted in frame 5n, which may be operated using a properly encoded cylindrical key 4h to rotate an interposing tab 4i away from an stop bracket 5o extending downward from the top surface of cover 5a. System unit 1 includes electronic logic 6, configured to provide and react to signals of the SCSI interface; an internal memory 7, such as a hardfile, also configured to provide and react to signals of this interface, and internal cables 8 and 8a, carrying the signals of the SCSI interface among logic 6, internal memory 7, and an external connector port 9. Peripheral unit 3 includes in this exemplary instance a memory device 10, such as one or more hardfiles or floppy disks, configured to provide and react to signals of the SCSI interface; and, external connector ports 11 and 12, all of which are connected by an internal cable 13. The system further includes an external cable 14, along which SCSI interface signals travel between external port 9 of system unit 1 and external port 11 of peripheral unit 3. External cable 14 includes a system cable connector 15, which mates with external port 9, a peripheral cable connector 16 which mates with external port 11, and a central section 17, wherein wires electrically connect the connectors.

The characteristics of the SCSI interface are such that, if external cable 14 is disconnected at either end, it is possible to attach a suitable unit, such as another system unit, to peripheral cable connector 16 of external cable 14, or to external port 9 of system unit 1, and to thereby activate the memory device 7 within the system unit so that data is transferred from this device to the new, suitable unit, after the system unit is turned off, without proceeding through any logical subroutines, such as the password routine, in the system unit by simply turning the power of the system unit on. Similarly, if external cable 14 is disconnected at either end, it is possible to connect a suitable unit, such as another system unit, to system cable connector 15 of external cable 14, or to external port 11 of peripheral unit 3, and to thereby activate memory device 10 within the peripheral unit so that data is transferred from this device to the suitable unit when the power of the peripheral unit 3 is turned on. Furthermore, with external cable 14 in place as shown, a suitable unit may be plugged into external port 12 of peripheral unit 3 to activate memory device 7 within system unit 1 and memory device 10 within peripheral unit 3 so that data is transferred from both these devices to the suitable unit. Thus, the integrity of the data stored within the memory devices of the system cannot be assured against the possibility that someone may plug a device into an external port of a unit or into an interconnecting cable in which the SCSI circuits are present, unless means is provided to lock any such cable in place and to lock shields over such external ports where interconnecting cables are not present. The provision of such locking means will now be discussed in reference to the remaining FIGURES.

Referring to FIG. 2, system unit 1 includes a planar board 20 and a SCSI interface adapter card 21, which are electrically and mechanically connected by card edge connector 22. Planar board 20 includes a number of circuits (not shown) and connections for other circuit cards (not shown), which provide the means to carry out the typical functions of, for example, a computer. Interface adapter card 21 includes a number of circuits (not shown), which generate, and react to, the SCSI interface signals on the circuits of internal cable 8, which is attached to the adapter card by means of another edge connector 23, and of external cable 14, which is attached to the adapter card by means of external port 9, a right angle connector fastened to the adapter card. Electrical contacts 24 within external port 9 make electrical and mechanical contact with electrical contacts 24a within system cable connector 15, which are in turn connected to various wires within central section 17 of external cable 14. Port connector 9 and cable connector 15 are of conventional types, with port connector 9 having a row of outwardfacing port contact terminals 24 extending along each side of an insulating support structure 24b, while cable connector 15 includes a contact assembly 24c, with a row of inward facing interconnection contact springs 24a extending along each side of a central slot, aligned to provide electrical contact with port contacts 24. Port connector 9 also includes an insulating housing 24d, holding a number of solder tails 24e, which form portions of circuits extending within system unit 1, being individually attached to contact terminals 24 and to various conventional circuit elements (not shown) on adapter card 21. Contact springs 24a are individually connected to insulated wires extending through central section 17 of cable 14. A support bracket 25, and an electrically grounding bracket 26, are also attached to interface adapter card 21 by means of rivets 27. Electrically grounding bracket 26 makes contact with grounding ribs 29 (shown in FIG. 3), by means of spring-biased contact surfaces 30, to provide a function of grounding appropriate circuits of the card assembly. Electrical grounding is further enhanced by tightening grounding screw 31, which has a threaded section 32, into grounded rear surface 5h of frame 5f, thereby clamping the lower portion of electrically grounding bracket 26 against the fixed cover. The mechanical connection between system cable connector 15 and external port 9 is enhanced by turning connector screws 34, which extend through the housing of this connector to engage threaded stand-offs 35, which are in turn screwed into threaded holes 36 in the external port. Connector screws 34 include step surfaces 37, which hold these screws within the housing of system cable connector 15 when this connector is removed from the external port.

It should be noted that the clamping functions provided by grounding screw 31 and by connector screws 34 do not provide a solution to the data security problem previously discussed in reference to FIG. 1, since these screws are accessible from outside the system unit 1. Therefore, in accordance with the present invention, top cover 5 of the system unit is locked in place by mechanical lock 4 (shown in FIG. 1), and front plate 40 of cable system connector 15, which extends into the gap within shroud 41 of external port 9, is extended to include a pair of tab sections 42, which extend through slots 43 in grounding bracket 26, into the internal space of system unit 1.

Figures 3, 4:
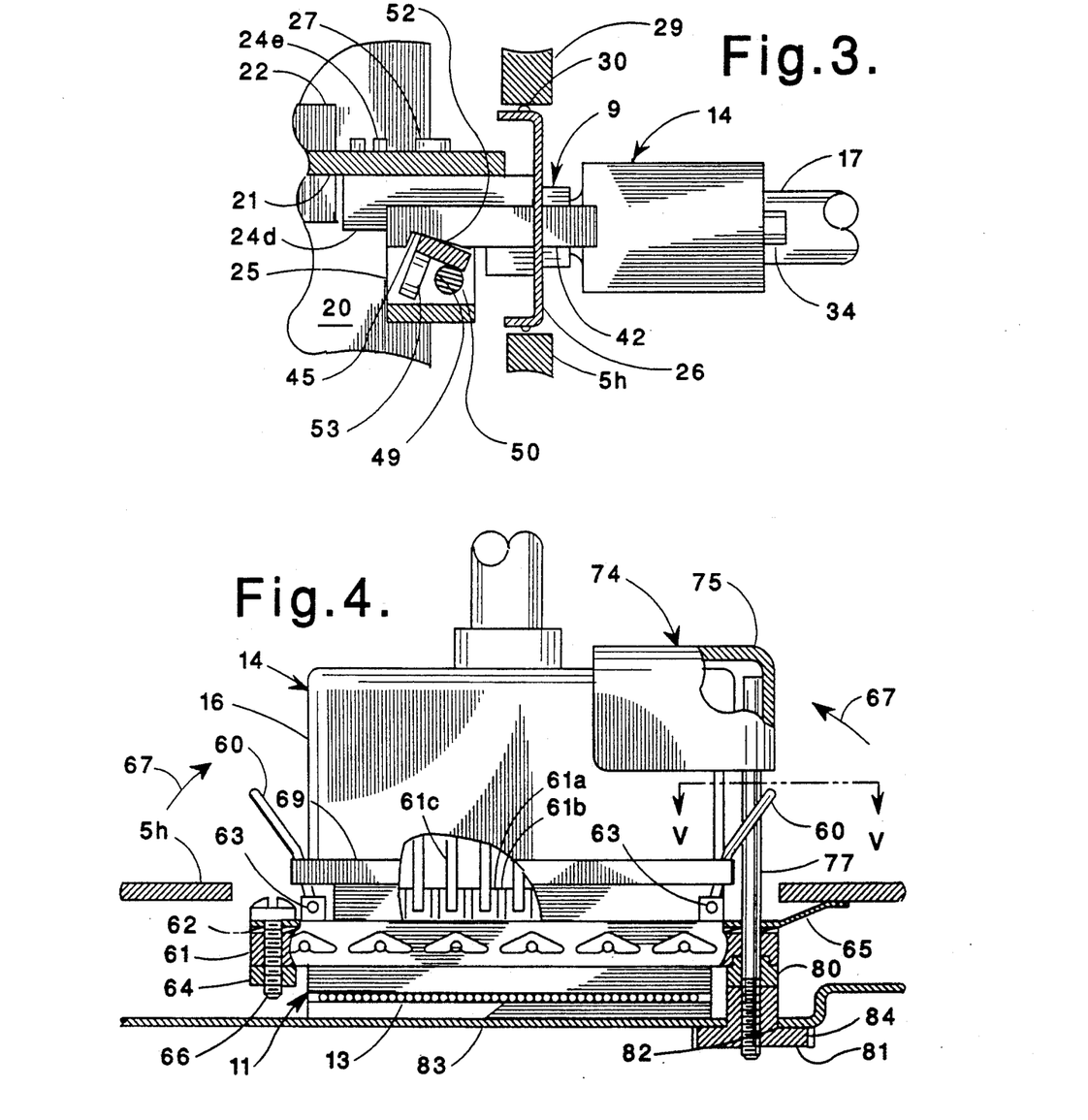
FIG. 3 is an enlarged partial sectional view in a system unit showing an external cable attached, along line III—III in FIG. 2.
FIG. 4 is an enlarged partial sectional view of a peripheral unit showing an external cable attached, as viewed from above (as seen in FIG. 1).

Referring to FIG. 3, each tab section 42 includes a notched area which provides a latching surface 45. Support bracket 25 pivotably mounts latching bracket 48 through holes 49. This latching bracket includes a pivot shaft 50, operating in these holes, to which a latching plate 52 is attached, preferably by projection welding. This latching plate includes a formed section 53, which operates as a cantilever spring against the adjacent inner surface of support bracket 25, holding this latching plate in a rotated position against the notched areas providing latching surfaces 45.

Referring back to FIG. 2, in order to provide for the manual release of latching bracket 48 from latching surfaces 45, a lever 55 is pressed in place on the top of pivot shaft 50, thereby also holding this shaft axially in place in the upper hole 49 of support bracket 25. Since this lever, and the rest of latching bracket 48 are entirely within system unit 1, this manual unlatching can be done only when the top cover 5 is removed after lock 4 is unlocked. When this card and cable are to be installed in a system unit not so equipped, mechanical lock 4 is first unlocked, and top cover 5 is removed. The assembly consisting of SCSI interface adapter card 21, external port 9, grounding bracket 26, support bracket 25, and latching bracket 48 is then installed into connector 22 on planar board 20, and grounding screw 31 is tightened. If an internal cable 8 is also to be used in the system, it is installed at this time by the attachment of connector 23 to the adapter card. External cable 14 is then installed with a connection motion which latches latching surfaces 45 of tabs 42 in place in front of latching plate 52. Top cover 5 may be installed before or after the connection of this cable. After this cable is installed, connector screws 34 are tightened. When this external cable 14 is to be removed from the system unit, mechanical lock 4 is again first unlocked, and top cover 5 is removed to provide access to lever 55. Connector screws 34 are then loosened, and the connector 15 is removed as lever 55 is held depressed in the direction of arrow 57.

The above discussion describes this invention as applied to a system unit in which SCSI adapter circuits are built into a separate card assembly, which can be added to the unit as an option or feature, and which can typically be placed in any one of a number of potential card positions within the unit. For this reason, latching bracket 48 is described as attached to the card assembly by means of support bracket 25. In this way, the latching bracket is always available where it is needed, adjacent to the external port of the adapter card assembly. This configuration is especially useful where the adapter can be plugged into any one of a plurality of locations, such as the slots in the rear of a typical personal computer.

In the alternative, the SCSI adapter circuits may be built into the planar board 20, or into another part of the system unit 1, in such a way that the location of the port 9 for the external cable 14 is at a fixed point in the system unit 1. In such a configuration, the latching bracket 48 may be alternately attached to the frame 33 of the system unit 1 (for example, by means of a suitable bracket) in a location adjacent to the location of port 9.

Figure 5:
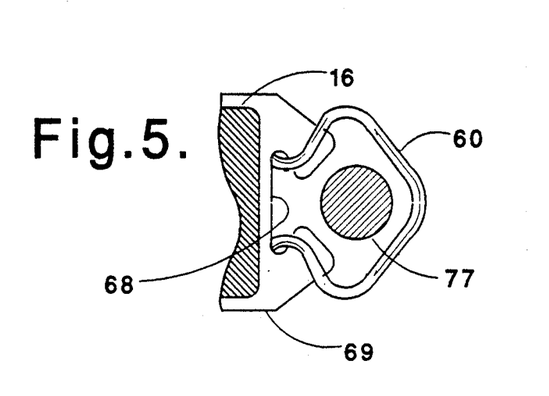
FIG. 5 is an enlarged sectional view along line V—V in FIG. 4.

Referring now to FIG. 4, peripheral cable connector 16, connected to external port 11 of peripheral unit 3, is held in place by a pair of wire bails 60. External port 11 includes a connector 61 of a conventional insulation displacement type, in which internal conductors (not shown) pierce the insulation of internal cable 13, to electrically connect the conductors therein to port contacts 61a extending in a row along each side of an insulating support structure 61b. Cable connector 16 is also of a conventional type, having a row of inward-facing interconnection contact springs 61c on each side of a central slot, aligned to engage port contacts 61a when connector 16 is plugged onto connector 11. External port 11 further includes a support plate 62, on which wire bails 60 are pivoted by means of pivot blocks 63, and an internally threaded mounting boss 64, to which an electrically grounding bracket 65 is attached by means of screw 66. The holding function of wire bails 60 is achieved as they are rotated in the directions of arrows 67 to clip in place in the widened portions of slots 68 (shown in FIG. 5) of flange 69 on cable connector 16.

While the clamping means described in the preceding paragraph is adequate to hold the connector 16 in place within the port 11, it is not adequate for data security, since wire bails 60 can be easily rotated in the directions opposite to arrows 67, releasing peripheral cable connector 16 from external port 11. For this reason, a locking bracket 74, consisting of a cap 75, extending around a portion of the body of connector 16, attached to a partially threaded shaft 77, is added to the assembly. This shaft 77 extends through a bushing 80 in external port 11, to be fastened in place by nut 81 operating in a hole 82 of mounting bracket 83. Nut 81 includes an outer surface 84 having ridges to facilitate manual turning.

To install this end of the external cable 14 in port 11 of peripheral unit 3, peripheral cable connector 16 may first be plugged into port 11 and clamped in place by the rotation of wire bails 60 in the directions of arrows 67. Top cover 5a of the peripheral unit 3 must be opened, by unlocking mechanical lock 4a, see FIG. 1, to gain access to the area in which nut 81 will be located. Locking bracket 74 is then installed in the position shown, with shaft 77 extending through bushing 80, and nut 81 is fastened in place on the threaded portion of shaft 77. Finally, top cover 5a of the unit is installed, and lock 4a is again locked.

To remove this end of the external cable 14 from port 11 of the peripheral unit 3, lock 4a must first be unlocked, so that top cover 5a of the unit can be opened to gain access to nut 81. Nut 81 is then loosened and removed, so that locking bracket 74 can be removed. Then cable connector 16 can be removed after wire bails 60 are disengaged by rotation in the directions opposite to arrows 67.

Figure 6:
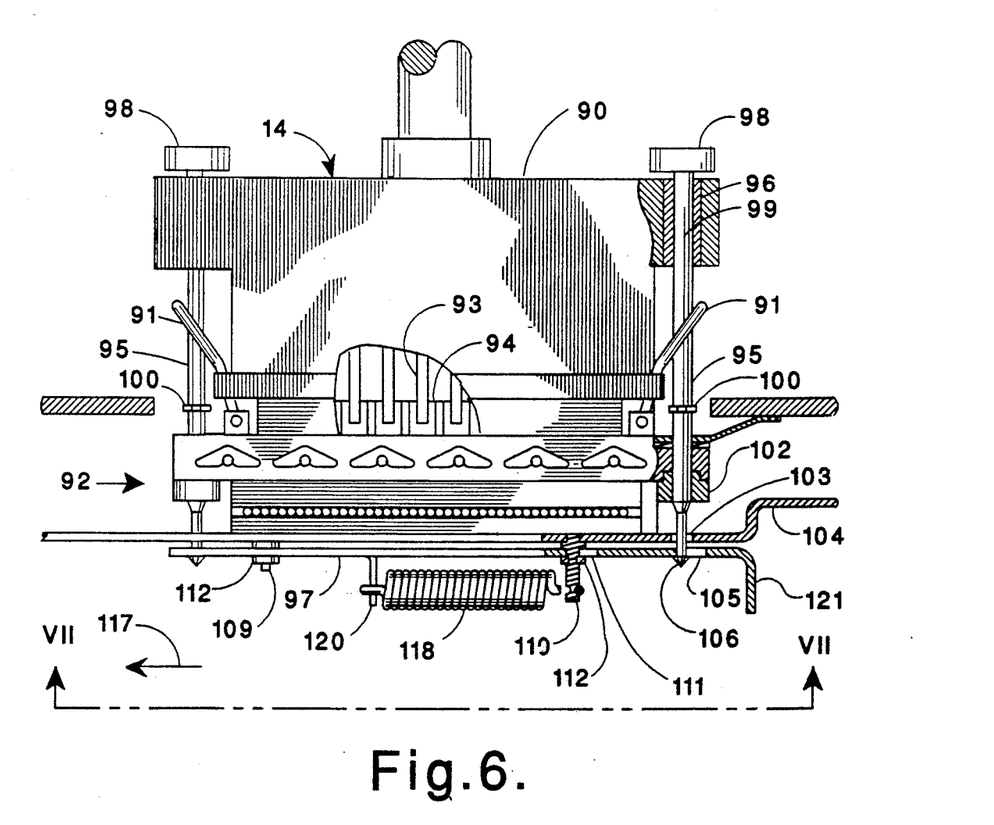
FIG. 6 is an enlarged partial sectional view of a peripheral unit showing an external cable attached, in an alternate embodiment of the invention.

Referring to FIG. 6, in an alternative embodiment of the design described above in reference to FIGS. 4 and 5, a cable connector 90 is similarly held in place by wire bails 91, in an external port connector 92. Cable connector 90 and port connector 92 similarly include conventional contact assemblies, in which inward-facing interconnection contact springs 93 of cable connector 90 make electrical contact with outward-facing contact terminals 94 of port connector 92. To provide the data security function by preventing the disconnection of this connector without the opening of top cover 5a, a pair of shafts 95, operating through sleeves 96 in the housing of connector 90, are latched in place by the sliding motion of a latching bar 97. Each shaft 95 includes a head 98, which facilitates manually sliding shafts 95 in either direction for locking or unlocking connector 90 in place on the external port; an upper sliding portion 99, which slides in sleeve 96 between the limits imposed by the inner surface of head 98 and a retaining clip 100; a lower sliding portion 101, which slides in bushing 102 of connector 92; the lower sliding portion 101 also having a latching portion which operates through clearance hole 103 in connector support bracket 104 and through latching hole 105 in latching bar 97; and a tapered tip 106. Latching bar 97 slides on pins 109 and 110, attached to connector support bracket 104, which extend through slots 111 in bar 97. The bar is held on pins 109, 110 by means of retaining clips 112.

Figure 7:
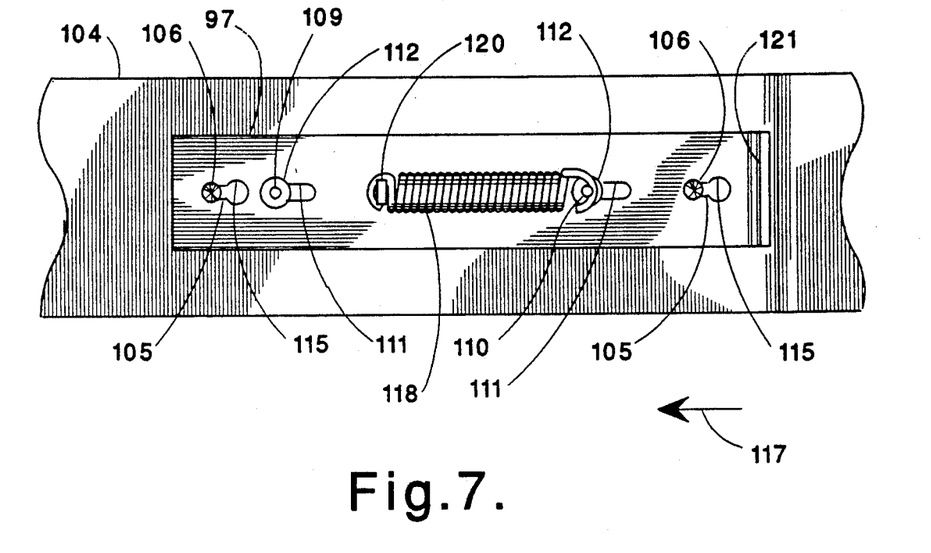
FIG. 7 is an enlarged internal view along line VII—VII in FIG. 6.

Referring to FIG. 7, each of the latching holes 105, in latching bar 97, operating over latching portions 103 of shafts 95, is each enlarged on an end 115 so that, when the bar is held in the direction of arrow 117, tapered tips 106 of shafts 95 can pass through the enlarged latching hole portion 115. Extension spring 118, stretched between an extension of pin 110 and a tab 120 formed in the latching bar, holds the latching bar in the direction opposite that of arrow 117, preventing the motion of tapered tips 103 of the shafts through latching holes 105.

To install this end of the external cable 14 in external port connector 92 of peripheral unit 3, peripheral cable connector 90 may first be plugged into the port connector and clamped into place by the rotation of wire bails 91. At this time, heads 98 of shafts 95 can be depressed only until tapered tips 106 of these shafts contact the narrow, slotted portions of latching holes 105 in latching bar 97, which is held in the direction of arrow 117 by extension spring 118. At this time, the cable connector 90 is installed and clamped in place by wire bails 91, but the data security feature has not been activated; i.e. someone can reverse the procedures to remove the cable simply by rotating the bails and disengaging the connector. Nevertheless, some users may want to operate their equipment in this manner at certain times, thereby retaining the ease of unplugging cable 14 without unlocking unit 3 and removing cover 5a.

To activate the data security feature of this mechanism, the top cover 5a of the unit is opened, by unlocking lock 4a, to obtain access to tab 121 of locking bar 97. Tab 121 is then pressed so that locking bar 97 is moved in the direction of arrow 117, and is held in this position while heads 98 of shafts 95 are depressed so that tapered ends 106 of the shafts move through the enlarged ends 115 of latching holes 105. After tab 121 is released, extension spring 118 restores the latching bar 97 by sliding it in the direction opposite to that of arrow 117, thereby locking the tapered shaft ends 106 in place by means of the narrow slotted portions of the latching holes.

It is likely that external cable 14 may be used with a peripheral unit from another manufacturer, not having the security system described herein. This system provides for this kind of use without providing the security feature at the connection between the cable and the peripheral device. Referring to FIG. 4, cable connector 16 can be used without locking bracket 74 in such an application, since the hole necessary for the installation of shaft 77 would generally not be available in the peripheral unit. Referring to FIG. 6, if the alternative embodiment for the cable connector 90 is used in such an application, shafts 95 will not extend through holes in the associated brackets, but peripheral cable connector 90 can still be installed and clamped in place by using wire bails 91, while shafts 95 are simply pushed outward through sleeves 96.

Figure 8:
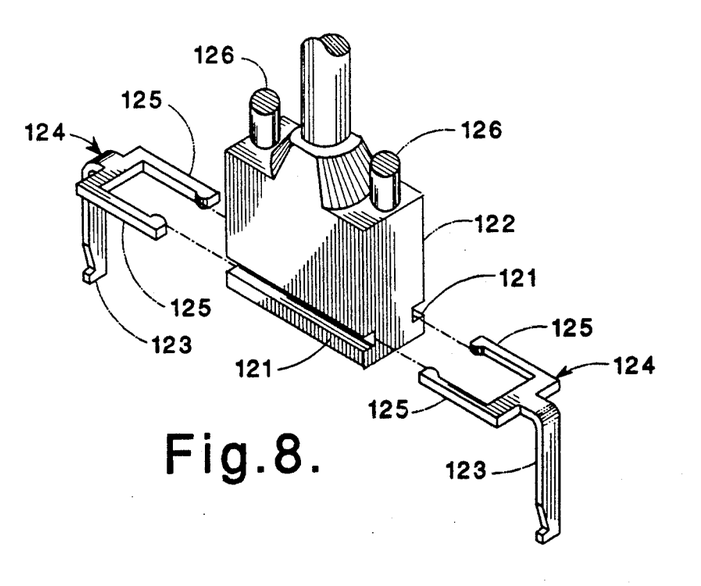
FIG. 8 shows a perspective view of an alternate embodiment of the present connector.

It is further possible to configure the system cable connector so that it can be used with system units not equipped to provide the safety feature. Since such a system unit 1 would not generally have slots through which tab sections 42 (shown in FIGS. 2 and 3) can extend into the system unit when the system cable connector 15 is installed, removable tab sections, as shown in FIG. 8, may be employed in an alternate embodiment of this connector. In this embodiment, a pair of slots 121 are provided in the housing of connector 122, and tab sections 123 are formed as a part of tab brackets 124. Thus, these tab brackets 124 are installed, by means of guides 125 operating in slots 121, when the connector is to be installed on a system unit equipped with the locking feature, and when use of the locking feature is desired; otherwise these tab brackets 124 are left off the connector 122. Clamping screws 126 are also provided to hold the connector in place whether or not the security feature is used.

There is a high likelihood that, in a system of units using the SCSI interface, one of the external ports will be left open, without a connected cable. For example, in the typical system shown in FIG. 1, external port 12 of peripheral unit 3 is left open. It is furthermore possible that a system can be configured with internal devices using the SCSI interface, while no external peripheral unit is connected to an external port provided by the hardware. In other words, referring to FIG. 2, internal devices using the interface may be connected to the circuits of interface card 21 by means of internal cable 8 without connecting external cable 14 to external port 9. In such cases, depending on the configuration of the electronic circuitry associated with the interface, the external port at the end of the interface may require the installation of a terminator. Such a terminator is a connector with appropriate circuitry connecting various contacts, but without a cable or other attachment to another connector.

Figure 9:
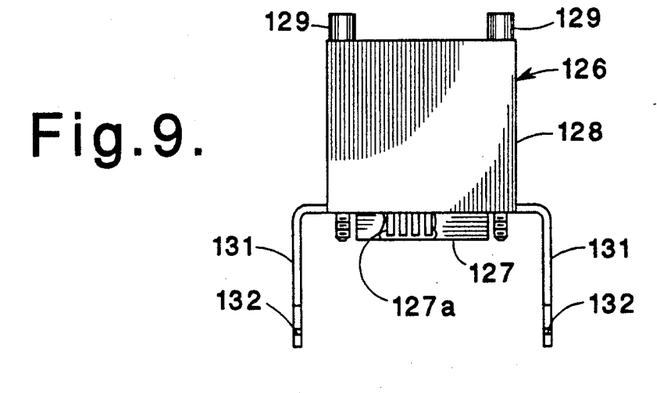
FIG. 9 is a side view of a terminator or shield configured to engage an external port of a system unit.

Referring to FIG. 9, such a terminator 126 may be provided with the configuration described above for system cable connector 15. Terminator 126 includes a connector 127, with contacts 127a; a housing 128, in which appropriate electronic circuits (not shown) are connected to various contacts within the connector; a pair of clamping screws 129, which function as clamping screws 34 in connector 15; and a pair of tab sections 131, which include notches 132, and which function like tab sections 42 in connector 15.

Figure 10:
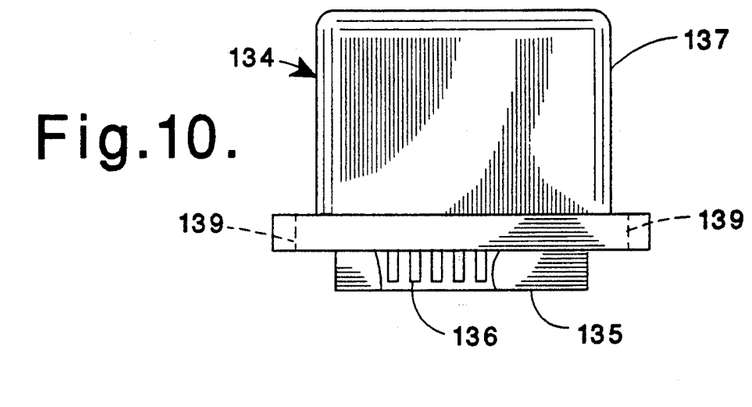
FIG. 10 is an enlarged side view of a terminator or shield configured to engage an external port of a peripheral unit.

Referring to FIG. 10, such a terminator may be provided with the configuration described above for peripheral cable connector 16. This terminator 134 includes a connector 135 with contacts 136; a housing 137, in which appropriate electronic circuits (not shown) are connected to various contacts within the connector; and a flange 138 with notches 139, into which wire bails 60 (shown in FIG. 4) may be rotated to clamp the terminator in place on an external port of a peripheral unit. It is particularly desirable that the dimensions of the housing 137 of this terminator be the same as those of the housing of connector 16, so that the same locking bracket 74 can be used to hold both the connector and the terminator in place as described in reference to FIGS. 4 and 5.

Figure 11:
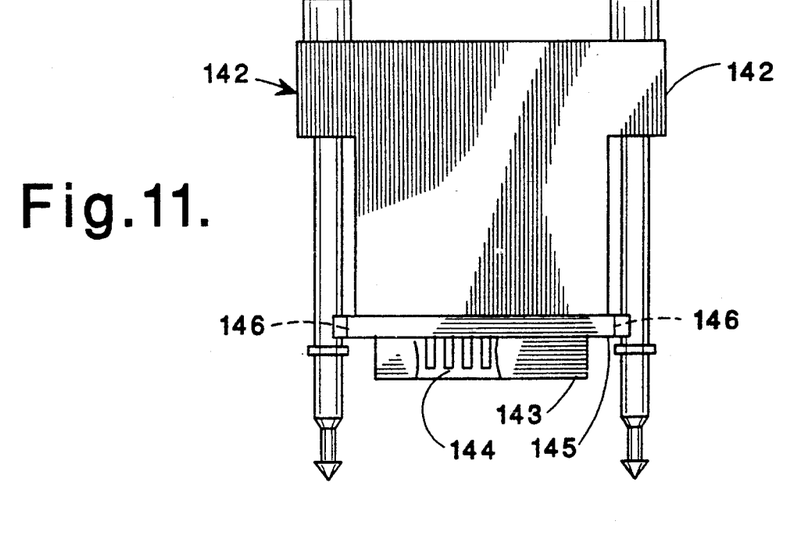
FIG. 11 is an enlarged side view of a terminator or shield configured, in accordance with an alternate embodiment of the invention, to engage an external port of a peripheral unit.

Referring to FIG. 11, if the alternative embodiment is used, such a terminator may be provided with the configuration shown for peripheral cable connector 90, as previously described in reference to FIG. 6. This terminator 142 includes a connector 143, with contacts 144; a housing 144 in which appropriate electronic circuits (not shown) are connected to various contacts within the connector; a flange 145 with notches 146, into which wire bails 60 (shown in FIG. 4) may be rotated to clamp the terminator in place; and a pair of shafts 147 slideably operating in housing 144 in the manner previously described for shafts 77.

The need for a terminator is determined partly by the system configuration and partly by the electronic circuits employed. For example, it is possible to build the circuits used in the terminator into the circuitry of the adapter card. If this is done, the terminator may not be needed for the proper operation of the circuits; but an external connector without an attached cable or terminator will present the kind of data security hazard described herein. In order to prevent this hazard, shields shaped as described in reference to FIGS. 9 through 11 may be employed. Such shields would not require the electronic circuits of the terminators; they would not even require electrical contacts; but shrouds would be provided in the areas of connectors 127, 135, and 143; and the latching hardware described above would be used to hold the shields in place like the terminators. These shrouds would extend around or into the connectors mating with the shields, thereby preventing contact with the circuits within these connectors, as long as the shields were locked in place.

Thus, in systems not requiring the electronics associated with terminator circuits, the three connectors shown in FIGS. 9 through 11 could be replaced by shields without contacts. Such shields could be, for example, identical to the terminators 126, 134, and 142, except for the absence of contacts and circuits. For example, if terminator 134, shown in FIG. 10, and a shield version thereof are both made with the same housing size as that of connector 137, the same locking bracket 74 can be used to hold a connector, terminator, or shield in place.

In the sense of providing data security, terminators and cable connectors also function as sheilds preventing access to circuits within port connectors, being locked in place over such port connectors by the means described above. In other words, such devices are types of shields in that they block physical access to circuits within the port connectors to which they are attached.

It is understood that the concepts described above can be applied to port and cable connectors having a wide variety of conventional connection geometries. The types of contacts described above have been described only by way of example. For example, one or both of the interconnections between a system unit and a peripheral unit can readily be reversed, with outward-facing terminal elements being attached to a supporting structure within the cable connector, while inward-facing contact springs are held in a contact structure within the port connector.

The above discussion has been limited largely to the data security problems presented by the SCSI interface, but there are a number of other configurations and applications which should be obvious to one skilled in the art. For example, in a system not using the SCSI interface, it is generally possible to tap external cables in such a way that data passing through the cables can be detected. The replacement of an external cable with one having such a tap or detection hardware could be prevented by the use of the invention described herein. Also, the use of locking connectors may prevent the theft of peripheral units from a central unit which is large or bolted down.

What is claimed is:

1. An apparatus comprising:
   a unit containing electronic circuits;
   a lockable and unlockable cover, which covers at least a portion of said unit, which can be opened and closed when unlocked, but which cannot be opened when locked, attached to said unit;
   a port external to said unit containing a number of port contacts electrically connected to circuits within said unit;
   an external shield covering said contacts, comprising in addition guiding surfaces for establishing a direction of removal for said external shield from said port;
   a tab extending, as a part of said external shield, into said unit in a direction opposite to said direction of removal, comprising a latching surface extending within said unit substantially perpendicular to said direction of removal;
   a latching bracket mounted within said unit, rotatably movable between a first position in which motion of said latching surface in said direction of removal is blocked and a second position in which motion of said latching surface in said direction of removal is permitted;
   wherein said latching bracket can be moved from said first position to said second position to release said external shield when said lockable and unlockable cover is open;
   wherein, as said tab is moved past said latching bracket in a direction opposite said direction of removal, said latching bracket is moved from said first position to said second position in contact with said tab, and from said second position to said first position as said latching surface moves by said latching bracket; and
   wherein said lockable and unlockable cover when closed blocks external access for movement of said latching bracket to release said external shield.

2. An apparatus as recited in claim 1 wherein said shield comprises a plurality of interconnection contacts configured to make electrical connection with said port contacts.

3. An apparatus as recited in claim 2, wherein said shield comprises additionally an a plurality of circuits connected among various said interconnection contacts.

4. An apparatus as recited in claim 2, wherein said shield comprises additionally an insulated electrical cable having a plurality of wires connected to said interconnection contacts.

5. An apparatus comprising:
   a unit containing electronic circuits;
   a lockable and unlockable cover, which covers at least a portion of said unit, which can be opened and closed when unlocked, but which cannot be opened when locked, attached to said unit;

a port external to said unit containing a number of port contacts electrically connected to circuits within said unit;

an external shield covering said contacts;

a bracket extending from said unit around part of said shield; and means for holding said bracket in place, operable to release said bracket when said lockable and unlockable cover is open, and not operable to release said bracket when said lockable and unlockable cover is closed, wherein said bracket is released only when said means for holding is operated.

6. An apparatus as recited in claim 5 wherein:

said bracket comprises a threaded portion extending within said unit, and said means for holding comprises a nut operable on said threaded portion.

7. A shield for blocking access to an external electronic port of a unit, wherein said shield comprises:

a housing configured to cover contacts within said port;

guiding surfaces to establish installation of said shield on said electronic port in a first direction;

a tab extending from said housing in said first direction; and a latching surface forming a part of an outer surface of said tab, facing a direction opposite to said first direction.

8. A shield as recited in claim 7, further comprising a contact assembly with a plurality of interconnection contacts configured to make electrical connections to contacts within said port.

9. A shield as recited in claim 8, further comprising a plurality of circuits electrically connected among said interconnection contacts.

10. A shield as recited in claim 8, further comprising a plurality of insulated wires within an insulated cover, electrically connected with said interconnection contacts, extending from said housing.

11. A latching bracket for holding a shield with a direction of removal in place over a port connector of a unit having a lockable cover, wherein:

said bracket is rotatably attached within said unit adjacent to an external port of said unit;

said bracket comprises a surface facing inside said unit, opposite said direction of removal, which is movable between two positions by rotation of said bracket;

said bracket is held in one direction of rotation by a biasing spring torque; and external access to said bracket is prevented when said lockable cover is in place in said unit.

12. A latching bracket for holding a shield with a direction of removal in place over a port connector extending from a circuit card assembly, wherein:

said bracket is rotatably attached to said circuit card assembly adjacent to an external port of said circuit card assembly; and said bracket is held in one direction of rotation by a biasing spring torque; and said bracket comprises a surface facing opposite said direction of removal which is movable between a position blocking outward motion of a shield and a position permitting such motion.

13. A locking bracket for holding a shield in place over a port connector of a unit having a lockable cover, wherein said lockable cover has a closed and locked position and an open position, wherein said locking bracket comprises:

a bracket housing configured to extend around a portion of said shield;

a threaded extension configured to extend within said unit; and a nut engaging said threaded extension, wherein said nut is operable to disengage said locking bracket from said shield when said cover is in said open position, and wherein said cover in said closed position blocks external access to operation of said nut.

14. An apparatus comprising:

a unit containing electronic circuits;

a lockable and unlockable cover, which covers at least a portion of said unit, which can be opened and closed when unlocked, but which cannot be opened when locked, attached to said unit;

a port external to said unit containing a number of port contacts electrically connected to circuits within said unit;

an external shield covering said contacts, comprising in addition guiding surfaces for establishing a direction of removal for said external shield from said port;

a latching shaft mounted to slide between travel limits within said external shield, comprising a latching surface extending within said unit substantially perpendicular to said direction of removal;

a latching bar mounted within said unit, movable between a first position in which motion of said latching surface in said direction of removal is blocked and a second position in which motion of said latching surface in said direction of removal is permitted;

wherein said latching bar can be moved from said first position to said second position to release said external shield when said lockable and unlockable cover is open; and wherein said lockable and unlockable cover when closed blocks external access for movement of said latching bracket to release said latching shaft.

* * * * *